United States Patent

Wavish

Patent Number: 5,903,885
Date of Patent: May 11, 1999

[54] DATA PROCESSING APPARATUS EVENT CAUSE DETERMINATION

[75] Inventor: Peter R. Wavish, West Hoathly, United Kingdom

[73] Assignee: U.S. Philips Corporation, New York, N.Y.

[21] Appl. No.: 08/715,696

[22] Filed: Sep. 18, 1996

[30] Foreign Application Priority Data

Sep. 27, 1995 [GB] United Kingdom ............... 9519677

[51] Int. Cl.⁶ .................................................. G06F 15/18
[52] U.S. Cl. ................................................. 706/46; 706/47
[58] Field of Search ................................. 706/46, 47, 52, 706/58

[56] References Cited

U.S. PATENT DOCUMENTS

| | | | |
|---|---|---|---|
| 4,903,215 | 2/1990 | Masuishi et al. | 706/47 |
| 4,970,657 | 11/1990 | Wolf | 706/52 |
| 5,418,887 | 5/1995 | Connah et al. | 706/58 |

FOREIGN PATENT DOCUMENTS

| | | | |
|---|---|---|---|
| 0359726A2 | 3/1990 | European Pat. Off. | G06F 11/00 |
| 0439342A2 | 7/1991 | European Pat. Off. | G06F 9/44 |
| 0439343A2 | 7/1991 | European Pat. Off. | G06F 9/44 |
| 0449402A2 | 10/1991 | European Pat. Off. | G06F 9/44 |

OTHER PUBLICATIONS

"Simulating and Implementing Agents and Multiple Agents Systems", M. Graham et al, Proc. European Simulation Multiconference 1991, pp. 226–231.

"The Behaviour Language: User's Guide", R.A. Brooks, AI Memo 1227, Massachusetts Institute of Technology Artificial Intelligence Laboratory, Apr. 1990.

"Maintaining Knowledge About Temporal Intervals", J.F. Allen, Communications of the ACM, Nov. 1983, vol. 26, No. 11, pp. 832–843.

"Application of Artificial Intelligence to Improve Plant Availability", M.V. Frank et al, Proceedings of the Conference on Intelligent Simulation Environments, Jan. 1986, pp. 92–97.

"Adding Temporal Reasoning to Expert–System–Building Environment", W.A. Perkins et al, IEEE Expert, Feb. 1990, pp. 23–30.

*Primary Examiner*—Allen R. MacDonald
*Assistant Examiner*—Sanjiv Shah
*Attorney, Agent, or Firm*—Anne E. Barschall

[57] ABSTRACT

A data processing apparatus comprises a first memory (212) storing a set of rules, each in the form of at least one specific behavior defining a condition and at least one further behavior defining an associated response with the condition portion of each rule having a characteristic time delay, and a processor (220) operating to respond to any of the said conditions being satisfied by generating one or more further behaviors defining the associated response. A second memory (206) coupled via the processor (220) to a clock (226) maintains a record of behavior state changes ("events") and the time at which they occurred. On selection of an event of interest, a first comparator (240) identifies the or those rules having the selected event behavior as at least a part of their response, and a second comparator (242) compares the condition portion of the or each rule identified by the first comparator with the maintained record of events (206) at a point preceding the selected event by the characteristic delay of the rule. A rule is identified as the cause of the selected event where an event consistent with the condition portion of that rule occurs at that preceding point.

8 Claims, 4 Drawing Sheets

| EN | S | Q | INT | SA |
|---|---|---|---|---|
| 10 | 1 | 0 | N/A | 100 |
| 18 | 0 | 1 | N/A | 150 |
| 86 | 1 | 0 | N/A | 200 |
| 80 | 0 | 0 | 1 | 250 |
| 92 | 0 | 0 | N/A | 300 |
| 96 | 1 | 0 | N/A | 350 |
| 52 | 0 | 0 | 0 | 400 |
| 24 | 0 | 0 | 1 | 450 |
| 88 | 1 | 0 | N/A | 500 |
| 82 | 0 | 0 | 1 | 550 |
| 98 | 0 | 0 | N/A | 600 |
| 26 | 0 | 0 | 1 | 650 |
| 32 | 0 | 0 | N/A | 700 |
| 90 | 1 | 0 | N/A | 750 |
| 84 | 0 | 0 | 1 | 800 |
| 94 | 0 | 0 | N/A | 850 |
| 38 | 1 | 0 | N/A | 900 |
| 44 | 0 | 0 | 0 | 950 |

FIG. 2

DATA PROCESSING APPARATUS EVENT CAUSE DETERMINATION

The present invention relates to a rule-based data processing apparatus and a method for use in such an apparatus for event cause determination.

Rule-based processor systems may support behaviour languages in which behaviours are either simple operations performed on a value, or rules, where a rule defines logical and temporal relations between events (behaviour state changes). Accordingly, events associated with the condition portion of a rule (also known as the left hand side behaviours of a rule) cause subsequent events associated with the response portion (right hand side behaviour) of the rule. An example of such a rule-based real time language is Real Time ABLE (RTA), described in Proceedings of the European Simulation Multiconference 1991 at pages 226–231. ABLE stands for Agent Behaviour LanguagE and is a highly concurrent production rule language for simulating agents and multiple agent systems. ABLE provides for tighter integration of time with the production rule system. The language may conveniently be compiled into a representation which comprises a number of interconnected elements such as (for virtual logic circuits) AND elements, OR elements, delay elements and so on. RTA uses a propagation technique as opposed to a search strategy to obtain a fast production rule system.

A further example of a rule-based language is given in "The Behaviour Language; User's Guide" by Rodney A. Brooks, A.I. Memo 1227, Massachusetts Institute of Technology Artificial Intelligence Laboratory, April 1990.

One problem which may be encountered when developing rule-based systems is that of rules firing in unexpected ways, either because the rule itself is coded wrongly, or else because the circumstances under which the rule might fire were not foreseen by the programmer. The result is some unexpected event. What the programmer needs is to be able to find out the rule that originated this event.

Event cause determination is traditionally linked to the keeping of historical records of rules and rule firings (that is to say the state change of the response portion of a rule following satisfaction of the condition portion) and the identification of a particular rule firing leading to an event has required deconstruction of the history to provide the identification. As will be recognised, this can become very inefficient in terms of the required storage where a system supports a large number of rules, and the time overheads involved in deconstruction of the explicit history would render such systems virtually unworkable, as well as being expensive in terms of processing power required.

It is therefore an object of the present invention to enable event cause determination for a rule based data processing system without requiring maintenance of an explicit history of which rules fired and when, and consequently without the requirement for deconstruction of such a history of firings.

SUMMARY OF THE INVENTION

In accordance with the present invention there is provided a method of event cause determination for a rule-based data processing system in which each rule is in the form of at least one behaviour defining a condition and at least one further behaviour defining an associated response and the condition portion of each rule has at least one characteristic time delay associated with it, comprising the steps of maintaining a record of behaviour state changes ("events") and the time at which they occurred and, for a selected one of the events:

identifying the or those rules having the selected event behaviour as at least a part of the response portion thereof;

for the or each rule so identified, comparing the at least one behaviour defining the condition portion of the identified rule with the maintained record of events at a point preceding the selected event by the or each characteristic delay of the rule; and indicating the identified rule as the cause of the selected event where the said at least one behaviour defining the condition portion of the identified rule changes state at the said point or points preceding the selected event.

The invention works in the context of (amongst others) RTA, which is a production rule language in which rules specify not only the conditions under which they fire but also a relative time delay from when the conditions are first satisfied to when the rule actually fires. By use of the delay or delays associated with each rule, the present invention allows the determination of the cause of events entirely from a history of state changes rather than from an explicit history of which rules fired and what caused them to fire. Rule functions such as link or copy commands may also be detected as event causes (for example which a characteristic delay of as little as zero) whilst a conventional approach would treat such functions as a separate class of problem requiring differing techniques.

The selection of an event interest may suitably cause the generation of a file as a sub-set of the record of behaviour state changes. Such a file may list, for each element, a current state and the time of the immediately preceding state change. The determination as to event cause may then be based on the file contents rather than the full record of behaviour state changes.

In such systems, one or more of the rules may be inactive at a given time. To take advantage of this to reduce further the processing required, the switching of a rule from inactive to active (off to on), or from active to inactive (on to off), may be treated as a further event held in the record of events thus providing a record of those rules active at a given time, with the step of identifying those rules having a response portion behaviour coincident with the selected event comprising comparison of the selected event behaviour with the response portion behaviours of only those rules active at the time of the selected event. The determination as to which rules are active may be based on the listing in a file as described above.

Also in accordance with the present invention there is provided a data processing apparatus comprising a first memory having stored therein a set of rules, each in the form of at least one specific behaviour defining a condition and at least one further behaviour defining an associated response, the condition portion of each rule requiring the presence of said at least one specific behaviour for a respective characteristic time delay, and the apparatus further comprising: processor means operable to respond to any said condition being satisfied by generating one or more further behaviours defining the associated response; a second memory coupled to the processor and a clock signal and maintaining a record of behaviour state changes ("events") and the time at which they occurred; event selection means arranged to output an indication of a selected behaviour state change; first comparator means coupled with the event selection means and the first memory and operable to identify the or those rules having the selected behaviour as at least a part of the response portion thereof; and second comparator means coupled to the first comparator means and the second memory and arranged to compare the condition portion of the or each rule identified by the first comparator means with the maintained record of events at a point preceding the selected event by the characteristic delay or delays of the rule, and to indicate the identified rule as the cause of the selected event where an event consistent with the condition portion of that rule occurs at that time point.

As will be readily appreciated, the first and second memories referred to above may comprise separate storage devices or may be discrete areas of a single memory. Also, the first and second comparator means recited above may be discrete devices or they may be incorporated as functions carried out within the processor.

Further features and advantages of the present invention are recited hereinafter and in the attached claims, to which reference should now be made.

The present invention will now be described, with particular reference to an RTA model of an asynchronous logic circuit illustrating the interrelationship between behaviours, time annotations and logical functions by way of example only, with reference to the accompanying drawings, in which:

BRIEF DESCRIPTION OF DRAWING

FIG. 2 is a state table representation of the system of FIG. 1;

DETAILED DESCRIPTION

Figure 1:
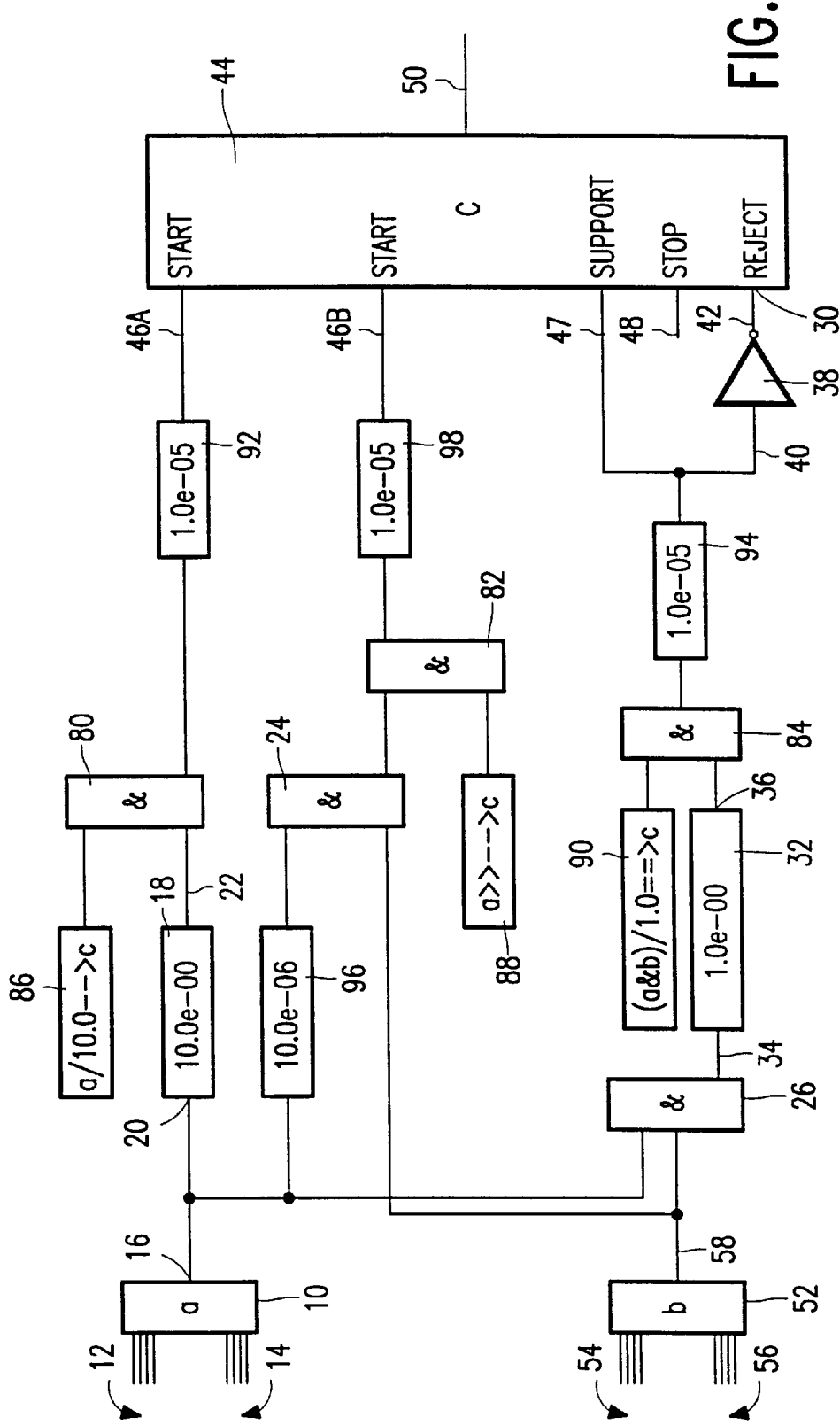
FIG. 1 is a logic representation of a production rule system.

For the purposes of illustration, FIG. 1 shows an asynchronous logic circuit compiled from a few simple RTA rules. Three simple behaviours (registers) a, b, and c are combined in three different rules, having respective rule function registers 86, 88, and 90, with the rule functions being implemented by combinations of logic functions and time annotations (delay elements). The Figure shows a simple implementation with each of the rules having a state change for behaviour c defining the response, such that the general propagation through the circuit of state changes is from left to right. In a more complex implementation, for example where behaviour c formed part of the condition portion of a rule having behaviour b defining the response, there may also be state change propagation from right to left of the Figure (e.g from c to b).

In the implementation of FIG. 1, register 10 (behaviour a) has a plurality of independent start or support inputs 12, a plurality of independent stop or reject inputs 14 (the difference between start and support and between stop and reject is discussed below) and an output 16. The output 16 is respectively connected to the input 20 of a first delay element 18, via a short (1 microsecond) delay element 96 to a first input of an AND element 24, and to a first input of an AND element 26. The delay element 18 sets a delay of 10.0 seconds (although it will be readily appreciated that other units of time may be used) such that the output of the element 18 will be turned on 10 seconds after the input is turned on: the output will however be turned off at the instant the input is turned off. The output 22 of the delay element 18 is combined with rule function 86 at AND element 80 such that the rule function may only be implemented when the rule is active (when the register output is "1"). The output of AND element 80 is connect through a delay element 92, is connected to a first start input 46A of a register 44 (behaviour c). The register 44 has an output 50. The delay of element 92 (suitably 10 microseconds) is provided to allow the state to settle before being read.

A further register 52 (behaviour b) has a plurality of start or support inputs 54, a plurality of stop or reject inputs 56 and an output 58. The output 58 is connected to second inputs of each of the AND elements 24 and 26. The output of AND element 24 is combined with the output of rule function register 88 at AND element 82 and from there via a delay element 98 (again to allow the state to settle before being read) to a further start input 46B of the register 44. The AND element 26 has an output connected to the input 34 of a further delay element 32 having a delay of 1.0 second. The output 36 of the delay element 32 is combined with the output of rule function register 90 at AND element 84 and, via a delay element (again to allow the state to settle before being read), is connected to support input 47 of the register 44 and to the input 40 of an inverter 38. The inverter 38 has an output 42 connected to a reject input 30 of the register 44.

The system of FIG. 1 embodies the following RTA program rules:

$$a/10.0\text{-->}c \tag{1}$$

$$(a\&b)/1.0\text{==>}c \tag{2}$$

$$a\text{>>}b\text{-->}c \tag{3}$$

(1) and (3) are examples of a type of rule called a licence. (1) has the effect of setting the status of behaviour c (register 44) if the status of behaviour a (register 10) has been set continuously for 10 seconds. In FIG. 1, this licence is effected by the delay 18 connected between the register 10 and one of the start inputs 46A of the register 44. (3) is an AND_THEN licence requiring the status of behaviour a to be presented before the status of behaviour b (register 52).

(2) is a type of rule called a schema which is similar to a licence but which provides the additional effect that as soon as the conditions which satisfied the schema no longer exist then the consequence of the schema is retracted. In this example, the status of behaviour c is set if behaviours a and b (the outputs of registers 10 and 52) are both set continuously for 1.0 second. This effect is provided by the output of the AND element 26 being coupled via the delay element 32 to the support input 47 of the register 44. However, the status of behaviour c must also be reset if either the status of behaviour a or the status of behaviour b is reset. This effect is achieved by the inverter 38 connected between the output of the AND element 26 and the reject input 48 of the register 44.

The elements of the representation can be regarded as edge-triggered by virtue of the propagating or forward-chaining nature of the apparatus. The inputs to register elements 10,52 and the output of the register element 44 will generally be connected to further sections of a larger asynchronous logic representation.

Such a logic representation may be stored in the memory of a data processing apparatus in the form of a table as shown in FIG. 2. Each of the behaviours (register elements 10,52,44), time annotations or settlement delays (delay elements 18, 32, 92, 94, 96, 98), logic functions (elements 24, 26, 38, 80, 82, 84) and rules (register elements 86,88,90) shown in FIG. 1 has a row in the table. Each row in the table identifies the element number EN (for the sake of clarity the reference numerals of the elements as they appear in FIG. 1 are used), a state flag S of the element, a queued status flag Q of the device (as will be explained), the internal status INT, and a propagate function start address SA. When the state of the element to which the row of the table relates changes (referred to herein as an event), a propagate function is executed to effect any appropriate changes to all of the elements which may be affected by such a change. These propagate functions are conveniently arranged at certain memory locations or start addresses SA. Changing the state of elements by propagation in such a manner rather than by searching for all of the elements affected by an event allows the apparatus to operate efficiently.

The differentiation between inputs as start or support (and also stop or reject) depends on whether they receive the result of a schema. Inputs 46A and 46B are start inputs as they receive the result of a licence whilst support input 47 receives the result of the schema. The AND element 24 of FIG. 1 is shown functioning as an AND_THEN element (like an AND element but requiring the inputs to be presented in a particular order), with additional delay 96 ensuring the correct order of receipt from register 10 and 52.

Figure 3:
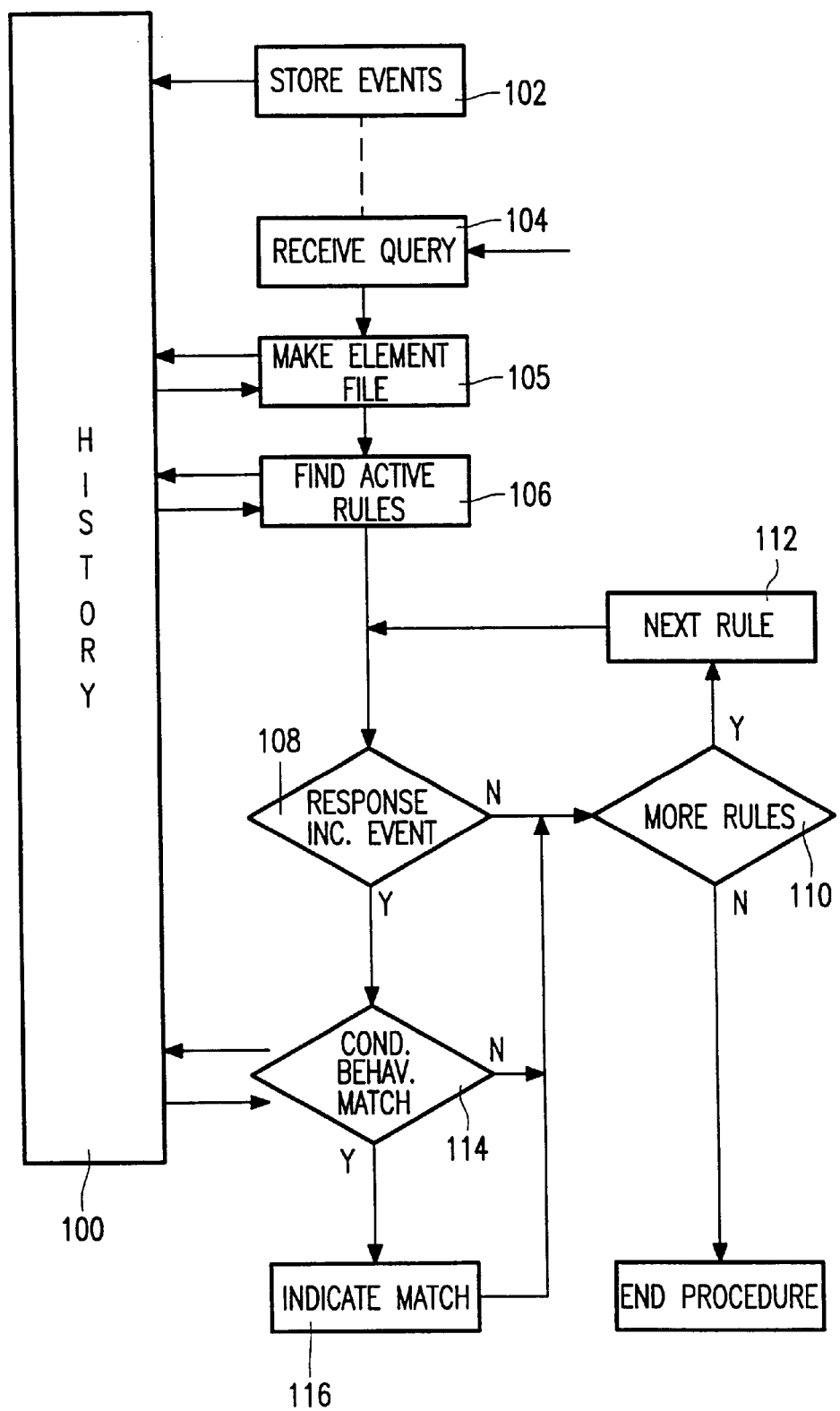
FIG. 3 is a flow chart illustrating a method of event cause determination according to the invention.

The method by which the cause of an event is determined is schematically represented by the flowchart of FIG. 3. The essence of the method is that the characteristic time delay associated with a rule is used to constrain the search for possible rules which could have caused the queried event. The time delay specified by the rule must exactly match the time delay shown in the history of the state changes (events) occurring during the run.

Specifically, during the RTA computation, a history of events is written to a file at step 102; this file is represented generally by the block 100 HISTORY to the left of the Figure. The history comprises changes of element states, together with the times at which they change.

When the user queries why a particular event happened (at step 104), the state of the RTA computation immediately before that point in time is computed from the history in the form of a file listing the current state S of each element and the time at which it last changed (step 105). The set of rules which were active (i.e. those rule function register elements having S=1 in the file from step 105) at that time is determined (step 106). The set of active rules are then checked at step 108, and the or those rules having the selected event behaviour as at least a part of their response portion are identified to step 114. If at step 108 a rule does not have the selected event behaviour as a part of its response, it cannot be the direct cause of the selected event: in such a case, a check is made as to whether there are any remaining active rules unchecked (step 110) and, if so, the next active rule is passed to step 108.

For each rule identified as a potential event cause by step 108, the behaviour defining the condition portion of that identified rule (or each of the behaviours in turn) is checked against the file from step 105 at that point in time preceding the selected event by the (or each) characteristic delay of the rule, at step 114. The rule element state is also checked against these characteristic delay points as an event may be due to a rule "switching on" if the conditions required to fire that rule are already present. A rule is indicated as a matched rule at step 116 (that is to say a probable cause of the selected event) where the check of step 114 shows that the, or one of the, behaviours defining the condition portion of the identified rule changes state at a point preceding the selected event by the respective characteristic delay. If step 114 does not show a rule to be matched, or following the indication of a match at step 116, the procedure returns to step 110 to call up the next rule or end the checking.

Having found the matched rule or rules which predict the query event correctly, the actual condition(s) which caused the rule to fire can be found by examining the condition portion of these rules. For instance, in a conjunction of conditions, the most recent condition to become true is the cause of the rule firing, and hence the cause of the event being queried.

Figure 4:
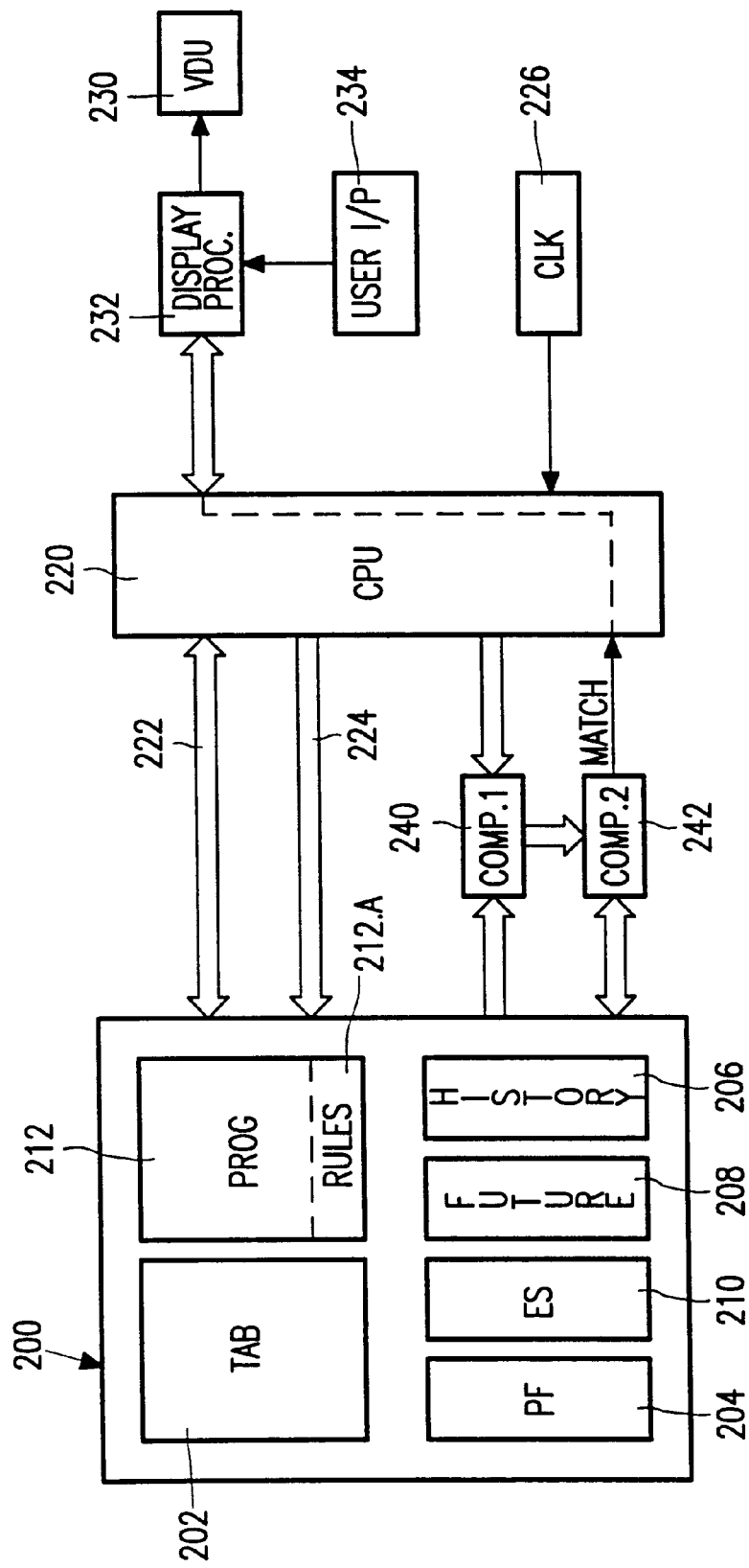
FIG. 4 is a block schematic diagram of a data processing apparatus embodying the present invention.

FIG. 4 is a block schematic diagram of a data processing apparatus embodying the invention. A random access memory (RAM) 200 provides a number of discrete storage areas, a first of which 202 holds the table containing the element number EN, state S, queued status Q and propagate function start addresses SA as described with reference to FIG. 2. The propagate functions PF starting at the start addresses are stored in another area 204 of the RAM. The RAM 200 also provides further storage areas for past element state changes (HISTORY) 206, future element state changes 208, an event stack 210, and a program store 212. The program store 212 holds the operating instructions set for a central processing unit (CPU) 220 and, in a separate area 212A, the set of rules, each in the form of at least one specific behaviour defining a condition and at least one further behaviour defining the associated response. Note that, in conventional operation, the rules would generally only be held in compiled form in the element and propagate function tables 202,204: the non-compiled rule set in the area of the program store 212A is required in this instance however for the event cause determination function. The CPU operating instruction set and the propagate functions 204 could, if desired, be stored in another memory device, for example a read only memory, and a record as to the time of the last state change for each element may be stored as a further row in element table 202.

The RAM 200 is connected to the central processing unit (CPU) 220 by a data bus 222 and an address bus 224 in known manner. The CPU operates on the compiled rules from the element and propagate function tables 202,204 responding to the satisfaction of condition behaviours by generating one or more further behaviours defining the associated response. Also in known manner, a clock (CLK) 226 is connected to the CPU 220.

The HISTORY area 206 of memory is coupled to the CPU and, via the CPU, to a clock signal from CLK 226 and maintains a record of behaviour state changes ("events") and the time at which they occurred. The storage area 208 for future element state changes is arranged as a two row table containing a plurality of time periods T and element numbers EN. Any number of elements numbers EN can be stored to correspond to a particular time period T and the states of these elements will all be changed during that time period. The table may be arranged for a consecutive sequence of time periods T, but it is preferred to use a stack containing only those time periods for which element numbers are stored, with the facility to insert element numbers and time periods as required due to operation of the program.

Generally, all element state changes except those corresponding to delay elements will be executed in the current time period although other element state changes such as register switchings can be also delayed if desired. Those element state changes which are to occur without a time delay may be placed in the event stack 210 for execution in the near future—i.e. later in the current time period, but before moving to the next time period for which an event is specified.

To enable monitoring of the program operation, a user is provided with a visual indication of behaviour state changes on a display VDU 230. The display is controlled by a suitable display processor 232 and may suitably show behaviour states against time in a graphical display, such as to enable the user to compare behaviour states for a given point in time. The information to form the display is taken from the HISTORY store 206.

For determining the cause of an event, the user is further provided with event selection means 234, such as a keyboard by which the user enters a numerical code or other identification for a particular event of interest. Alternatively, or additionally, the event selection means may comprise an XY pointer device, such as a mouse or trackball, by which the user can move a cursor on the display 230 to select a particular event (behaviour state change) from a graphical display of state changes as described previously.

The determination as to which rule firing cause the event of interest is as previously described with reference to FIG. 3, with first 240 and second 242 comparators respectively effecting the tests of steps 108 and 114 of FIG. 3. Although shown as separate devices, it will be readily understood that these comparator functions could instead be carried out within CPU 220. To avoid the need for comparison of all rules by the first comparator 240, the HISTORY memory area maintains in parallel with the record of events a record of those rules active (state S=1) at a given time. In this way, the first comparator 240 can check only those rules active at the time of the event of interest, as the inactive rules could not have provided the event cause.

Having identified a matched rule, the second comparator 242 outputs a MATCH signal which, via the CPU, is passed to the display processor 232 to generate a suitable indication of the identified rule as the cause of the selected event to the user.

The operation of the foregoing method and apparatus depends on a property of languages such as RTA, which is that time delays are built into rules, and so causes of events which happened some time previously can easily be found. Additionally, it becomes possible to move back fairly quickly through the history to find causes of causes and so on, without having to deconstruct the history. This contrasts with a conventional production rule language, which is cyclic, so that the set of rules maps one state into the next, and reasoning about which rules fired only takes you back one step in the computation, so causal information stretching over many cycles of the production system and hence over longer intervals of time is not immediately available.

From reading the present disclosure, other modifications will be apparent to persons skilled in the art. Such modifications may involve other features which already known in the field of data processing apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

I claim:

1. A method of event cause determination for a rule-based data processing system in which each rule includes a respective condition portion including
at least one respective behaviour defining a condition; and at least one associated characteristic time delay; and
a respective response portion including at least one further behaviour defining an associated response, the method comprising
maintaining a record of behaviour state changes ("events") and the time at which they occurred and,
for a selected one of said events ("said selected event"):
identifying at least one of said rules ("the at least one identified rule") having said selected event as at least a part of the respective response portion thereof;
for the at least one identified rule, comparing the at least one respective behaviour defining the respective condition portion thereof with the maintained record of events at at least one point, the at least one point preceding said selected event by the at least one characteristic delay of the at least one identified rule;
generating an indication of the at least one identified rule as the cause of said selected event, where the at least one behaviour defining the respective condition portion of the at least one identified rule changes state at the at least one point; and one of
storing said indication in a medium readable by a data processing device; or
communicating said indication to a user using a an output device.

2. A method as claimed in claim 1, wherein
one or more of the rules may be inactive at a given time, and
the switching of a rule from inactive to active, or from active to inactive, is a further event held in said record of events, and
the identifying the at least one identified rule comprises comparing said selected event with behaviors in the respective response portions of only those of the rules that are active at the time of said selected event.

3. A method as claimed in claim 1, further comprising
selecting the selected event
in response to such selecting,
generating a file as a sub-set of said record of events,
listing, in said file for each of said behaviours,
the state of such behavior at a time immediately prior to said selected event and
the time of a state change preceding such behavior, and
wherein said indicating is based on said listing.

4. A method as claimed in claim 1, in which, where said step of comparing indicates a conjunction of conditions from the condition portions, the one of said conditions having a state change with the shortest characteristic delay is indicated as the cause of said selected event.

5. A data processing apparatus comprising
a first memory having stored therein a set of rules, each of said rules including
a respective condition portion including at least one specific behaviour defining a condition and requiring presence of said at least one specific behaviour for at least one respective characteristic time delay and
a respective response portion including at least one further behaviour defining an associated response,
processor means operable to respond to any said condition being satisfied by generating one or more further behaviours defining said associated response;
a clock signal source;
a second memory coupled to said processor and the clock signal source and being arranged to maintain a record of behaviour state changes ("events") and the time at which they occurred;

event selection means arranged to output an indication of a selected one of said events ("said selected event");

first comparator means coupled with said event selection means and said first memory and operable to identify at least one of said rules ("the at least one identified rule") having said selected event as at least a part of the respective response portion thereof; and second comparator means, coupled to said first comparator means and said second memory, and arranged
to compare
the respective condition portion of the at least one identified rule with
said maintained record of events at a time point preceding said selected event by the respective at least one characteristic delay of the at least one identified rule, and
to indicate the at least one identified rule as the cause of said selected event where the selected event is consistent with the respective condition portion of the at least one identified rule, and
occurs at the time point.

6. An apparatus as claimed in claim 5, wherein said second memory is arranged to maintain in said record of events a record of off/on and on/off rule transitions of said rules, a most recent transition of "off/on" meaning active and a most recent transition of "on/off" meaning inactive, said first comparator means is further coupled to said second memory and is arranged to identify those of said rules having a respective response portion consistent with said selected event by comparison of said selected event with said respective response portion of only those of said rules that are active at the time of said selected event.

7. An apparatus as claimed in claim 5, wherein said event selection means comprises user operable means for identifying an event.

8. An apparatus as claimed in claim 7, further comprising
a display device and
a display processor connected thereto, said display processor being coupled to receive said record of events from said second memory and operable to generate a graphic presentation thereof for presentation on said display device, and
said event selection means comprises means operable to select an event by indication thereof in the said graphic presentation.

\* \* \* \* \*